United States Patent [19]
Tomlinson et al.

[11] Patent Number: 5,428,950
[45] Date of Patent: Jul. 4, 1995

[54] STEAM CYCLE FOR COMBINED CYCLE WITH STEAM COOLED GAS TURBINE

[75] Inventors: Leroy O. Tomlinson, Schenectady; Raub W. Smith, Clifton Park, both of N.Y.

[73] Assignee: General Electric Co., Schenectady, N.Y.

[21] Appl. No.: 161,070

[22] Filed: Dec. 3, 1993

Related U.S. Application Data

[63] Continuation-in-part of Ser. No. 145,633, Nov. 4, 1993.

[51] Int. Cl.[6] ............................................. F02C 6/18
[52] U.S. Cl. ................................. 60/39.02; 60/39.182
[58] Field of Search .............. 60/39.02, 39.182, 39.19, 60/39.83; 122/7 R

[56] References Cited

U.S. PATENT DOCUMENTS

| | | |
|---|---|---|
| 1,901,873 | 3/1933 | Holzwarth . |
| 3,691,760 | 9/1972 | Yidal et al. . |
| 3,879,616 | 4/1975 | Baker et al. . |
| 4,424,668 | 1/1984 | Mukherjee . |
| 4,519,207 | 5/1985 | Okabe et al. . |
| 4,576,124 | 3/1986 | Martens et al. . |
| 5,042,247 | 8/1991 | Moore . |
| 5,199,256 | 4/1993 | Moore . |

FOREIGN PATENT DOCUMENTS

| | | |
|---|---|---|
| 0363979 | 4/1990 | European Pat. Off. . |
| 0379930 | 8/1990 | European Pat. Off. . |
| 1355952 | 6/1974 | United Kingdom . |
| 1408174 | 10/1975 | United Kingdom . |

OTHER PUBLICATIONS

"IEEE Spectrum", vol. 14, No. 10, Oct. 1977, pp. 36–41; Robert Uram.

*Primary Examiner*—Louis J. Casaregola
*Attorney, Agent, or Firm*—Nixon & Vanderhye

[57] ABSTRACT

In a combined cycle system including a gas turbine (412), a steam turbine (420) and a heat recovery steam generator (436), wherein gas turbine exhaust is used in the heat recovery steam generator (436) for reheating steam for the steam turbine (420), an improvement wherein steam is extracted from the high pressure section (422) of the steam turbine 420, conducted to the gas turbine (412) for cooling hot gas turbine parts, and returned to the intermediate pressure section (424) of the steam turbine (420).

11 Claims, 5 Drawing Sheets

STEAM CYCLE FOR COMBINED CYCLE WITH STEAM COOLED GAS TURBINE

RELATED APPLICATIONS

This application is a continuation-in-part of copending application Ser. No. 08/145,633 filed Nov. 4, 1993.

TECHNICAL FIELD

This invention relates to power generation systems and specifically to combined cycles in which exhaust gases from a gas turbine are recovered in an unfired heat recovery steam generator followed by steam turbine expansion.

BACKGROUND PRIOR ART

In typical combined cycle power generation systems, cooling of gas turbine high temperature components and the accompanying steam cycle are usually of the following types:

(1) Air Cooled Gas Turbine—The gas turbine high temperature components are cooled by air extracted or conducted from other components in the cycle. The steam cycle and the gas turbine coolant streams are not integrated.

(2) Water Cooled Gas Turbine—The gas turbine high temperature components are cooled with water in the liquid phase. The heat extracted from the high temperature gas turbine components is integrated with the combined cycle steam bottoming cycle. The energy extracted from the high temperature section of the gas turbine is transported to the low temperature portion of the steam cycle to maintain the water in the liquid phase, thus compromising thermal efficiency of the cycle.

(3) Steam Cooled Gas Turbine Integrated Into a Combined Cycle with Multiple Pressure—This cycle uses steam from the low pressure section of a multiple pressure combined cycle to cool the high temperature components of the gas turbine with energy extracted from the gas turbine returned to the low pressure section of the steam cycle. This system is described in U.S. Pat. No. 4,424,668. The thermal efficiency that can be achieved by this system is inferior to that achievable with this invention, however, because, in the '668 system, energy is transported from the high temperature part of the cycle to a low temperature section of the cycle for conversion of the heat energy to power.

SUMMARY OF THE INVENTION

The application of steam for cooling the high temperature parts of a gas turbine enhances the performance capability of the gas turbine over that of gas turbines employing air from the gas turbine cycle for high temperature part cooling. In a more specific application, when a gas turbine with steam cooling is incorporated in a combined steam and gas cycle power system, the configuration of the steam cycle that supplies the cooling steam to the gas turbine and subsequently extracts energy from the steam that is heated by the gas turbine for power production influences the efficiency of the combined cycle power system. In a first group of embodiments, the invention relates to a steam cycle for a combined cycle system incorporating a steam cooled gas turbine that provides steam to the gas turbine at high pressure to achieve maximum heat transport, and to enable maximum power output from the heat recovered from the gas turbine cooling duty. As such, the invention may be incorporated into combined cycles of varying configurations including the following: (1) steam generation at one or multiple steam pressures; (2) non-reheat, single or multiple reheat cycles; (3) power generation or combined heat and power cycles; and (4) unfired or supplementary fired heat recovery steam generators.

The steam cycle in accordance with this first group of embodiments has three distinct aspects: (1) Steam at the highest pressure in the steam cycle is piped to the gas turbine(s) to perform the cooling duty. (2) All or part of the steam is extracted from the heat recovery steam generator, conducted to the gas turbine for cooling, and returned to the heat recovery steam generator superheater for further heating (or conducted directly to the steam turbine). (3) The steam that is heated by the gas turbine cooling duty is conducted to a steam turbine at the highest pressure admission point to achieve maximum power output from the steam that is superheated by the gas turbine cooling duty.

In accordance with this continuation-in-part application, it has been discovered that, for multi-pressure reheat combined cycles, low pressure cooling steam may be supplied to the gas turbine cooling system. This arrangement optimizes the mechanical design of the cooled gas turbine parts by permitting such parts to be manufactured with thinner walls which enhance heat transfer to the cooling steam. While the thermal efficiency of the combined cycle system in this instance may be reduced slightly, the cost of the system can also be expected to decrease, so that the overall benefits of the cycles are essentially equal.

Thus, in accordance with one aspect of the invention in accordance with this continuation-in-part application, there is provided in a combined cycle system including a gas turbine, a steam turbine and a heat recovery steam generator, wherein gas turbine exhaust is used in the heat recovery steam generator for reheating steam for the steam turbine, the improvement comprising means for supplying gas turbine cooling duty steam from a high pressure section of the steam turbine and conducting the gas turbine cooling duty steam to the gas turbine for cooling hot gas turbine parts, and means for returning the gas turbine cooling duty steam to an intermediate pressure section of the steam turbine.

In another aspect of the invention in accordance with this continuation-in-part application, there is provided in a combined cycle system including a gas turbine, a steam turbine, and a heat recovery steam generator wherein gas turbine exhaust is used in the heat recovery steam generator for reheating steam for the steam turbine, the improved method of cooling the gas turbine comprising the steps of:

a) removing at least some steam from a high pressure section of the steam turbine and delivering the removed steam to hot parts of the gas turbine to cool the hot parts; and b) returning the removed steam to an intermediate pressure section of the steam turbine.

Other objects and advantages of the present invention will become apparent from the detailed description which follows.

BEST MODE FOR CARRYING OUT THE INVENTION

Figure 1:
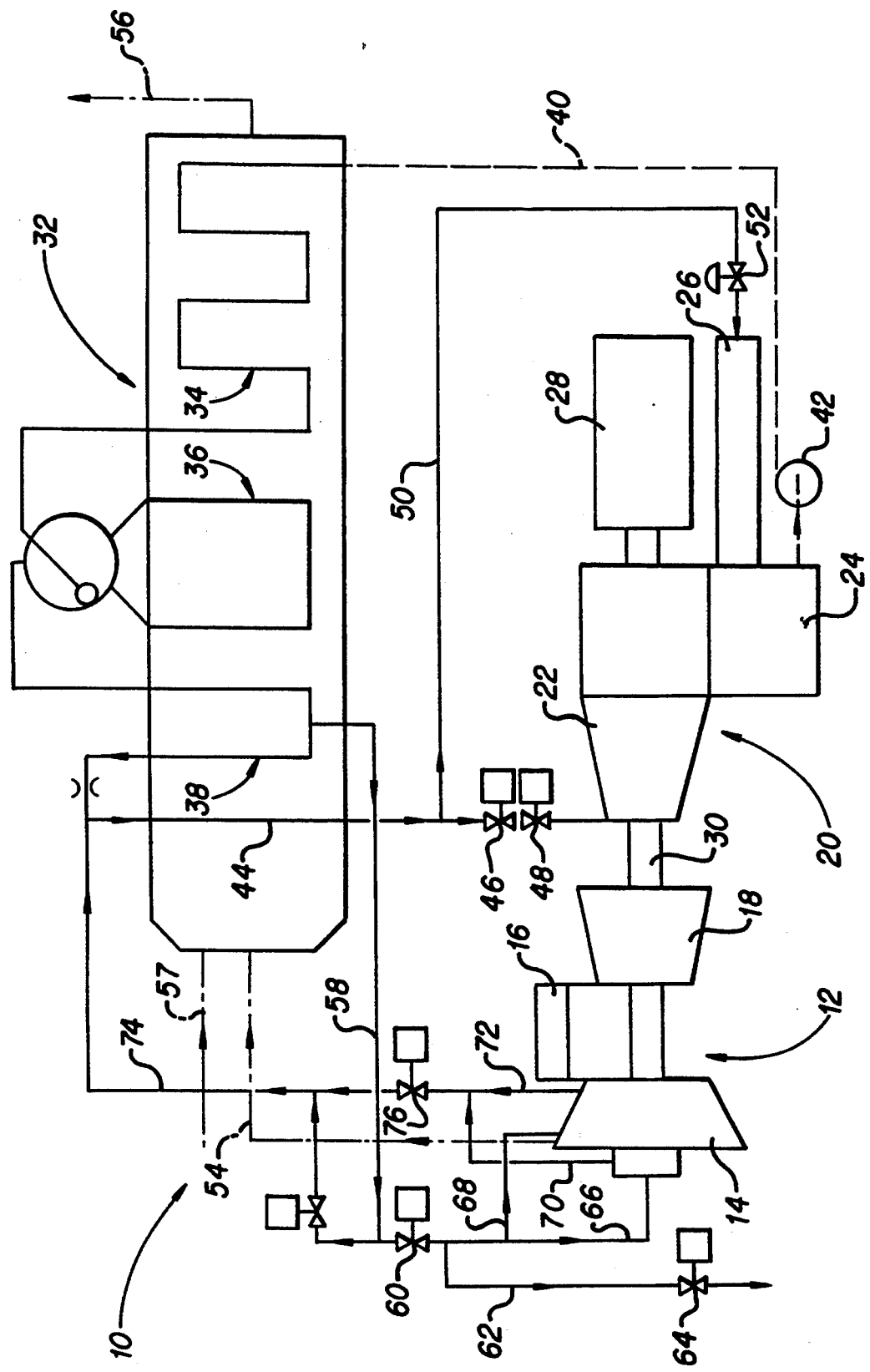
FIG. 1 is a schematic flow diagram of a single pressure non-reheat combined cycle system with a steam cooled gas turbine in accordance with this invention.

With reference to FIG. 1, the present invention is shown incorporated into a single pressure non-reheat combined cycle power generation system 10. The gas turbine portion of the system is shown at 12 and includes a compressor 18, a combustion system 16 and a turbine section 14. The steam turbine system 20 includes the steam turbine 22, condenser 24 and an attemperator 26. The steam turbine 22 drives a generator 28 which produces electric power.

In this single pressure non-reheat cycle system, the turbine section 14 and steam turbine 22 are coupled to generator 28 in tandem arrangement on a single shaft 30.

The steam turbine system 20 has an unfired heat recovery steam generator (HRSG) 32 including an economizer section 34, evaporator 36 and superheater 38. In this system, condensate from the steam turbine 22 is fed to the HRSG 32 via conduit 40 with the aid of pump 42. The condensate passes into the HRSG 32 and through the economizer 34, evaporator 36 and superheater 38, after which it is returned to the inlet side of steam turbine 22 via conduit 44 and appropriate stop/control valves 46, 48. A portion of the superheated steam may be diverted via conduit 50 and steam turbine bypass valve 52 to the bypass attemperator 26, typically during start-up and shutdown. As in conventional combined cycle systems, the steam condensate from steam turbine 20 is reheated in the HRSG 32 by exhaust gases from the gas turbine 12 which are introduced into the HRSG 32 via conduit 54, and exit the HRSG 32 via stack 56. Optional fuel may be added to the HRSG via inlet 57. To this point, the above description reflects a conventional combined cycle system.

In accordance with this first embodiment, all or some of the steam is extracted from the HRSG for use in cooling hot parts of the gas turbine 12. More specifically, steam at the highest pressure in the steam cycle, i.e., steam in the superheater 38 is transported to the gas turbine 12 via conduit 58, under the control of cooling steam stop valve 60. Steam may condense to water during system start-up. Such condensate is drained from the system via conduit 62 and valve 64. The cooling steam is otherwise directed to the high temperature parts of the gas turbine 12 via conduits 66, 68. The cooling steam is thereafter delivered to the superheater 38 via conduits 70, 72 and 74 and cooling steam isolation valve 76.

By this arrangement, steam at the highest pressure in the steam cycle, i.e., steam in the superheater 38, is piped to the gas turbine 12 to perform the cooling duty. In turn, the steam that is heated by the gas turbine 12 is conducted back to the superheater 38 and then to the steam turbine at the highest pressure admission point in the steam turbine to achieve maximum power. Steam heated by the gas turbine cooling duty may, alternatively, be conducted directly to the high pressure admission point of steam turbine 20.

Figure 2:
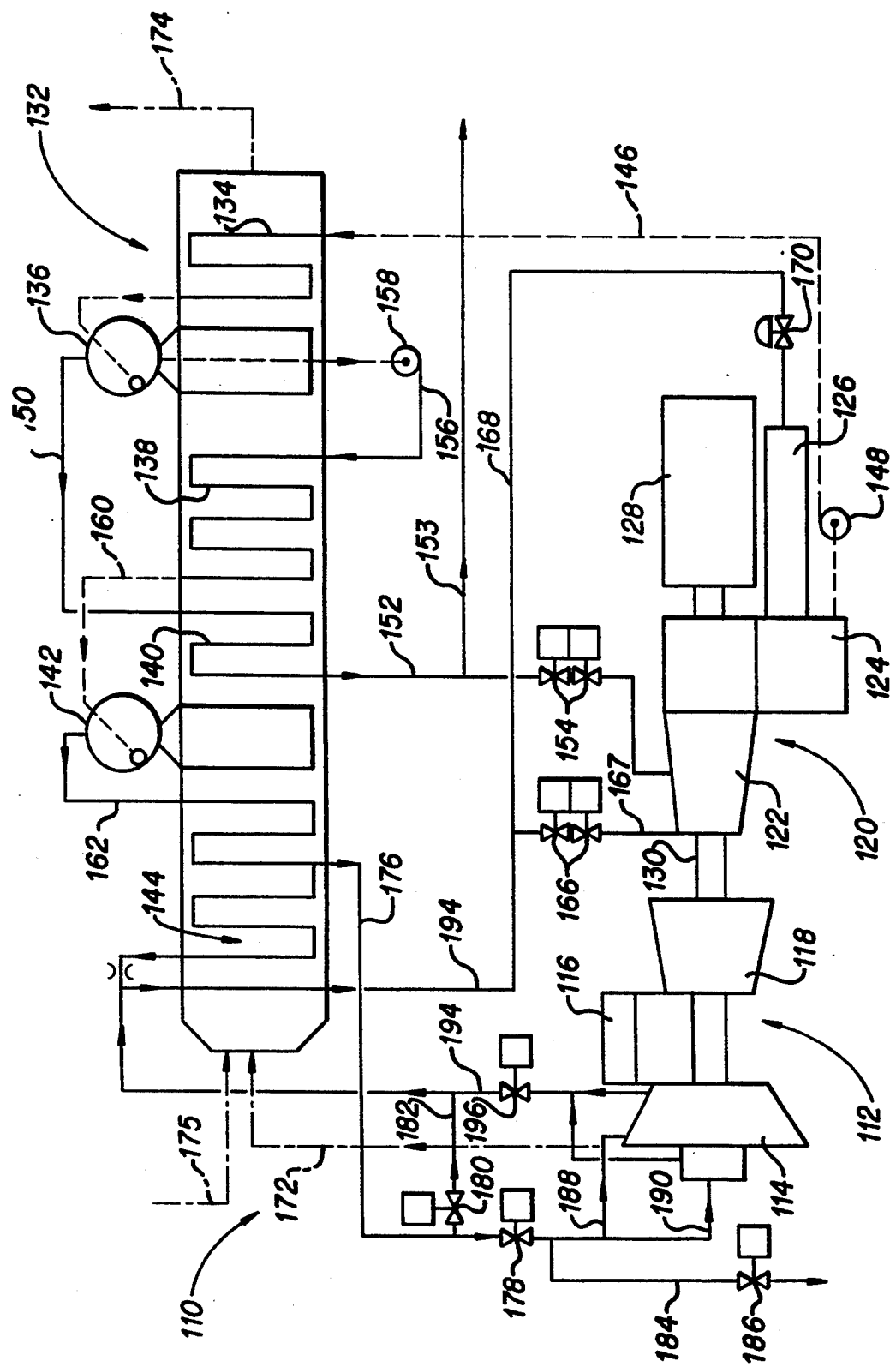
FIG. 2 is a schematic flow diagram of multi-pressure, non-reheat combined cycle system with a steam cooled gas turbine in accordance with an alternative embodiment of the invention.

With reference now to FIG. 2, another exemplary embodiment of the invention is shown which incorporates steam cooling of a gas turbine in a multiple pressure, non-reheat combined cycle power generation system.

More specifically, as in the previous embodiment, the combined cycle system 110 comprises a gas turbine system shown at 112 and includes a compressor 118, a combustion system 116 and a turbine section 14. The steam turbine system 120 includes the steam turbine 122 which has multiple steam admission points each at different pressures, a condenser 124 and a bypass attemperator 126. The steam turbine drives the generator 128 which produces electrical power. The gas turbine section 114, steam turbine 122 and generator 128 are again arranged in tandem, on a single shaft 130.

The steam turbine system 120 has an unfired HRSG 132 with a low pressure economizer 134, a low pressure evaporator 136, a high pressure economizer 138, a low pressure superheater 140, a high pressure evaporator 142, and a high pressure superheater section 144.

Condensate from the steam turbine 122 is fed from the condenser to the HRSG 132 via conduit 146 with the aid of pump 148. The condensate passes into the HRSG 132 and through the low pressure economizer 134, and into the low pressure evaporator 136. A portion of the low pressure steam is removed from the low pressure evaporator 138 via conduit 150 and passed through the low pressure superheater 140 and then conducted to the low pressure section of the steam turbine 122 via conduit 152 and low pressure admission stop/control valves 154.

Feedwater from low pressure evaporator 136 is passed through the high pressure economizer 138 via conduit 156 and pump 158. This steam is then conducted to the high pressure evaporator 142 via conduit 160 and the high pressure superheater 144 via conduit 162.

The steam ultimately is returned to the high pressure section of the steam turbine 122 via conduit 164, main steam stop/control valves 166 and conduit 167. A portion of the steam may be diverted via conduit 168 and bypass valve 170 to the attemperator 126 (typically during start-up and shutdown).

Again, in conventional combined cycle systems, heat is provided to the HRSG by the exhaust gases from gas turbine 112 introduced into the HRSG 132 via conduit 172 and which exit the HRSG 132 via stack 174. Optional fuel may be introduced into the HRSG 132 via inlet 175.

In accordance with the second embodiment of the invention, all or part of the steam extracted from the high pressure superheater 144 is first conducted to the gas turbine 112 before being delivered to the steam turbine. More specifically, steam at high pressure from superheater 144 is diverted to the gas turbine 112 via conduit 176 and cooling steam stop valve 178. A gas turbine bypass valve 180 is available to return the high pressure steam to the superheater 144 via conduit 182. Again, steam may condense to water during start-up, and this condensed water is drained from the system via conduit 184 and valve 186. The cooling steam is otherwise directed to the high temperature parts of the gas turbine 112 via conduits 188, 190. The cooling steam is thereafter returned to the superheater 144 by means of conduit 194 via cooling steam isolation valve 196.

Here again, steam at the highest system pressure is piped to the gas turbine 112 for cooling duty. In turn, the steam that is heated by the gas turbine 112 is conducted to the steam turbine at the highest pressure admission point of the steam turbine to achieve maximum power, either directly or indirectly via superheater 144.

In an optional arrangement, process heat may be removed from the system in the form of LP steam from the LP superheater 140, by way of conduits 152 and 153.

Figure 3:
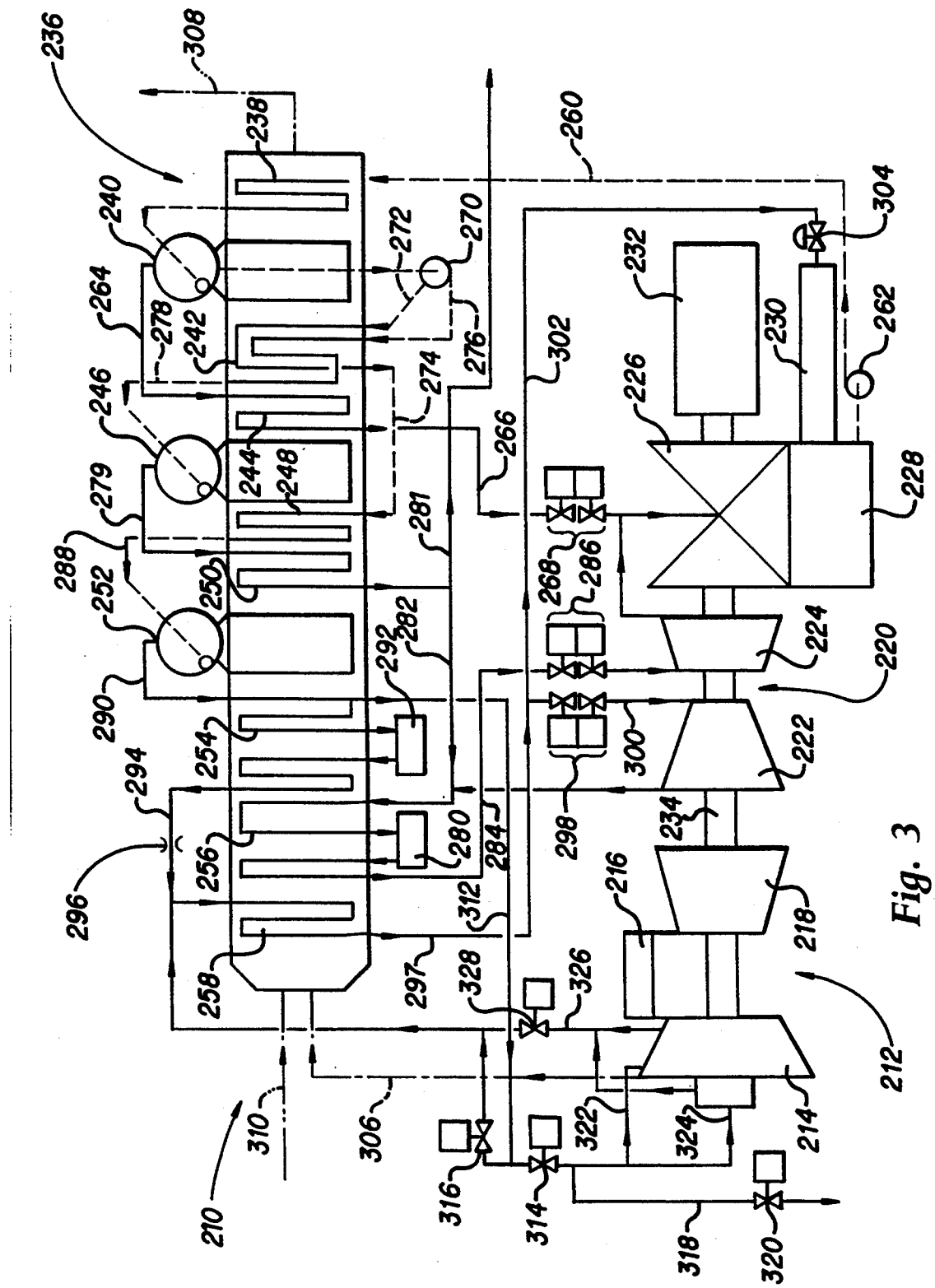
FIG. 3 is a schematic flow diagram of a multi-pressure reheat combined cycle system with a steam cooled gas turbine in accordance with still another embodiment of the invention.

With reference now to FIG. 3, the invention is incorporated in a multi-pressure reheat combined cycle power generation system 210. This embodiment includes a gas turbine system 212 comprising a compressor 218, a combustion system 216 and a turbine section 214. A steam turbine system 220 includes a high pressure section 222, an intermediate pressure section 224 and one or more low pressure sections 226 with multiple admission points at different pressures. The low pressure section 226 also includes a condenser 228 and an attemperator 230. The steam turbine drives the generator 232 which produces electrical power. The gas turbine 212, steam turbine 220 and generator 232 are arranged in tandem, on a single shaft 234.

The steam turbine system 220 is associated with a multi-pressure HRSG 236 which includes at least an LP economizer 238, and LP evaporator 240, an HP and IP economizer 242, a low pressure superheater 244, an IP evaporator 246, an HP economizer 248, an IP superheater 250, an HP evaporator 252, a first HP superheater 254, an HP reheater 256, and a second HP superheater 258, all arranged in conventional fashion.

Condensate from the steam turbine low pressure section 226 is fed from condenser 228 to the HRSG 236 via conduit 260 with the aid of pump 262. The condensate subsequently passes through the LP economizer 238 and into the LP evaporator 240. Steam from the low pressure evaporator 240 is fed to the LP superheater 244 via conduit 264 and is then returned to the low pressure section 226 of the steam turbine 220 via conduit 266 and LP admission stop/control valves 268.

Feedwater is removed from the LP evaporator 240 and, with the aid of pump 270, passed 1) through the HP and IP economizer 242 via conduit 272 and then to the HP economizer 248 via conduit 274; and 2) through the HP and IP economizer 242 via conduit 276 and then to the IP evaporator 246 via conduit 278.

Steam from the IP evaporator 246 passes through the IP superheater 250 via conduit 279, and is then passed to the reheater 256 and attemperator 280 via conduit 282. After passing through the reheater 256, the reheated steam is returned to the IP section 224 of the steam turbine 220 via conduit 284 and stop/control valves 286.

Meanwhile, condensate in the HP economizer 248 is passed to the HP evaporator 252 via conduit 288. Steam exiting the HP evaporator 252 via conduit 290 passes through the superheater 254 and its associated attemperator 292 (optional), and then through superheater 258 (via conduit 294 and flow restrictor 296). Superheated steam is then returned to the HP section 222 of the steam turbine 220 by way of conduit 297, stop/control valves 298 and conduit 300. A portion of the HP steam may be directed via conduit 302 and bypass valve 304 to the attemperator 230 (again, typically on start-up).

Heat is provided to the HRSG 236 by the exhaust gases from gas turbine 212 introduced into the HRSG 236 via conduit 306 and which exit the HRSG 236 via stack 308. Optional fuel may be added to the HRSG 236 via inlet 310. In accordance with this invention, a portion of the HP steam from HP evaporator 252 is drawn from superheater 254 and is transferred to the gas turbine system 212 for cooling duty via conduit 312 and controlled by valve 314. A gas turbine bypass valve 316 is available to return the high pressure steam to the superheater 258. Steam condensed to water during start-up is drained from the system via conduit 318 and valve 320. The cooling steam is otherwise directed to the high temperature parts of the gas turbine 112 via conduits 322, 324. The cooling steam is thereafter returned to the superheater 258 by means of conduit 326 via cooling steam isolation valve 328.

The gas turbine cooling duty steam is then admitted to the HP section of the steam turbine 222. As in the previously described embodiments, the gas turbine cooling duty steam may be returned directly to the HP section of the steam turbine 222, bypassing the superheater 258.

In an alternative arrangement, process heat may be drawn off from the IP superheater 250 by means of conduit 281.

In each case described above, the steam employed for cooling duty in the gas turbine is taken at the highest pressure in the steam cycle, and is returned to the system at a location where it can be admitted to the steam turbine at the highest pressure, thereby achieving maximum efficiency and power.

Figure 4:
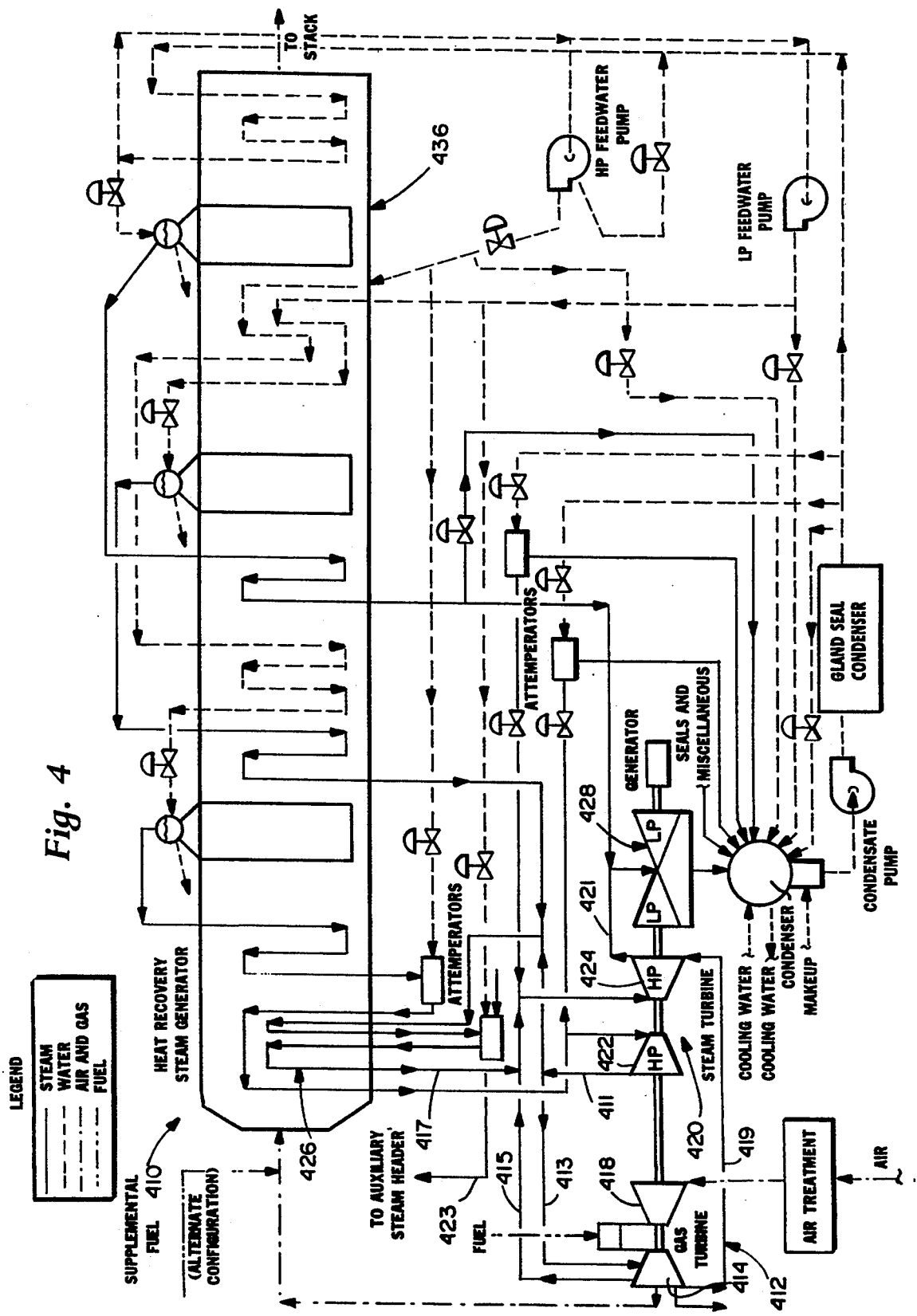
FIG. 4 is a schematic flow diagram for a multi-pressure reheat combined cycle system with a low pressure steam cooled gas turbine in accordance with this continuation-in-part application.

With reference now to FIG. 4, and in accordance with this continuation-in-part application, a low pressure cooling steam arrangement is incorporated into a power generation multi-pressure reheat combined cycle system 410 of the type generally as shown in FIG. 3. In this arrangement, low pressure cooling steam (also referred to as gas turbine cooling duty steam) is taken from the steam turbine HP section 422 discharge (i.e., the normal HP section discharge or exhaust outlet and supplied, via conduits 411,413 to the compressor section 414 of the gas turbine 412 for cooling the hot gas path parts. The cooling duty steam, heated by the gas turbine cooling duty, is then conducted directly to the inlet of the IP section 424 of the steam turbine 420 via conduit 415, but in the preferred arrangement, this (now heated) cooling duty steam is mixed with steam in conduit 417 from the reheater 426 in the HRSG 436, before admission to the IP section 424 of the steam turbine 420 for further expansion. Also shown in FIG. 4 is a gland leak off conduit 419 by which a very small amount of steam leak off from the gas turbine rotor gland is returned to the exhaust of the IP section 424 of the steam turbine 420.

The system as otherwise shown in FIG. 4 is conventional and need not be described in any further detail. As indicated above, the significant aspect of this embodiment, i.e., the low pressure gas turbine cooling duty steam arrangement, optimizes the mechanical design of the cooled gas turbine parts in that it permits such parts to have thinner walls (relative to the thicker walls required when high pressure cooling steam is employed as described in conjunction with FIGS. 1–3).

An alternative arrangement to that shown in FIG. 4 is to return the gas turbine cooling duty steam to the IP section 424 of the steam turbine 420 but at a location downstream of the IP inlet. In other words, in the FIG. 4 embodiment, the cooling steam is returned at the existing IP inlet whereas in this alternative arrangement, the steam is admitted to the IP section downstream of the inlet. It is believed that this arrangement will result in increased performance, but will also increase costs by reason of adding another opening into the IP section.

Figure 5:
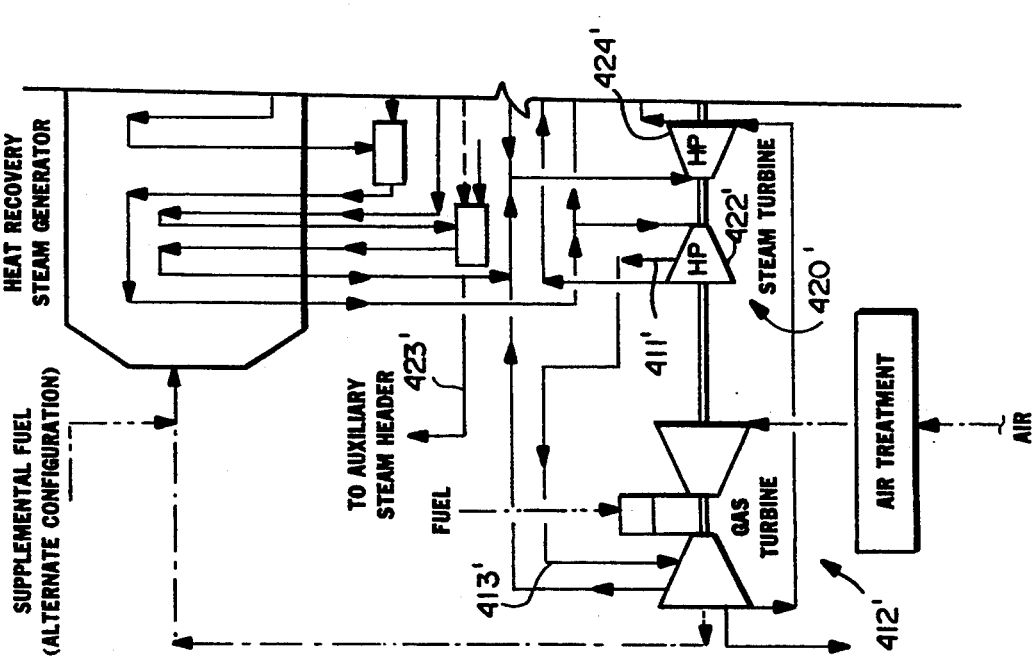
FIG. 5 is a partial schematic flow diagram similar to FIG. 4 but in accordance with an alternative embodiment thereof.

Other low pressure cooling steam arrangements are also within the scope of the invention. For example, and with reference to FIG. 5, the gas turbine cooling duty steam may be extracted from the steam turbine 420' (at a pressure higher than that of the steam from the steam turbine HP section 422' discharge) via conduits 411' and 413' at a pressure considerably lower than the pressure of steam taken from the high pressure evaporator within the HRSG as in the embodiments described in connection with FIGS. 1–3. More specifically, the cooling steam is extracted from the HP section 422' upstream of the HP section discharge. After cooling the hot gas path pans of the gas turbine 412', the heated gas turbine cooling duty steam may be returned directly to the IP section 424' of the steam turbine 420' again, preferably mixed with reheat steam (via conduit 417') as in the FIG. 4 embodiment. It is noted here that FIG. 5 is essentially a partial view of FIG. 4, but with changes as noted above. For the sake of brevity, the description of other elements in FIG. 5 as well as those not shown in FIG. 5 will not be repeated.

It has also been discovered that the arrangement described above in connection with FIG. 5, where gas turbine cooling duty steam is extracted from the HP section 422' and returned to the IP section 424', can also be used with single or multiple pressure non-reheat steam cycles as well.

Figure 6:
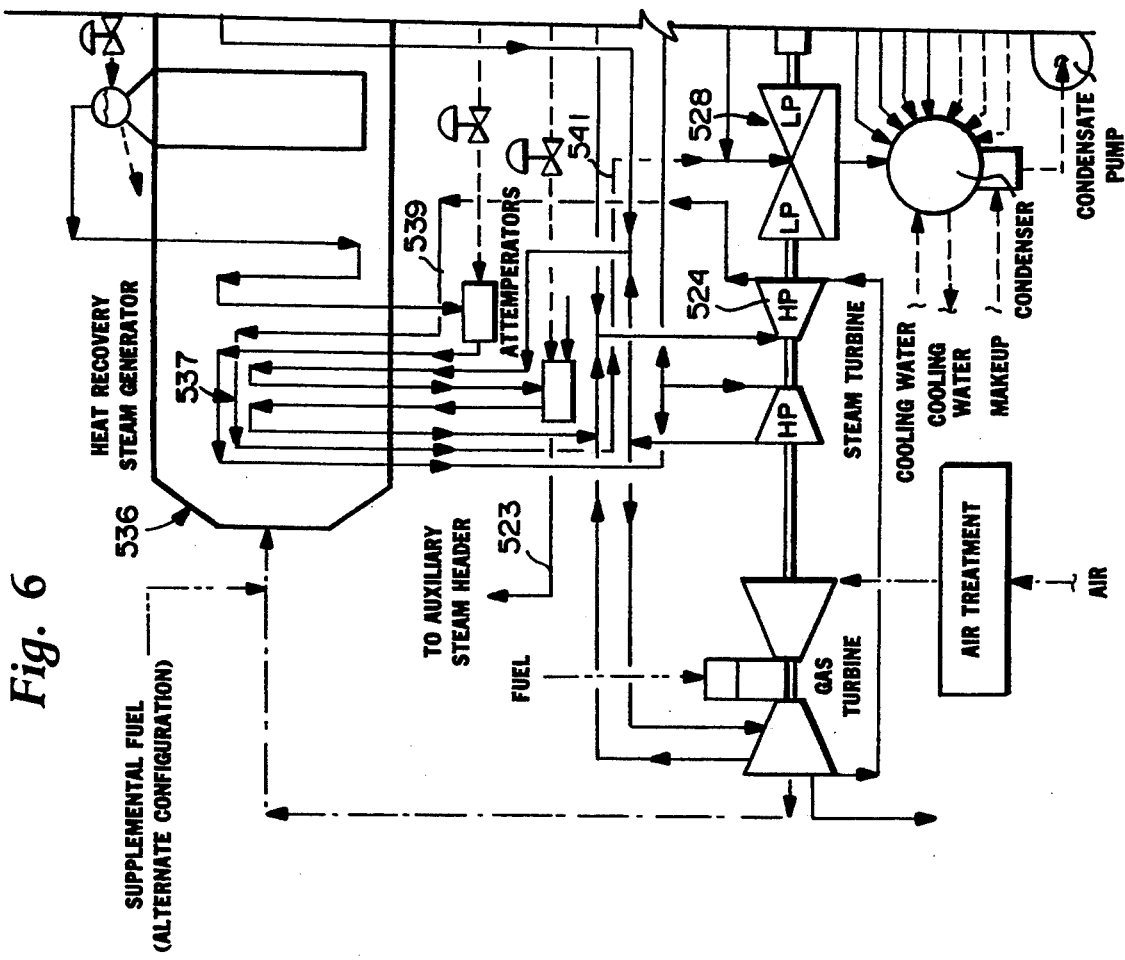
FIG. 6 is a partial schematic flow diagram similar to FIG. 4 but in accordance with another alternative embodiment thereof.

With reference now to FIG. 6, still another embodiment of the invention is disclosed wherein the gas turbine cooling duty circuit is as shown in FIG. 4, but in the context of a multiple pressure double reheat steam cycle. For convenience, only the double reheat circuit need be described here, since FIG. 6 is otherwise identical to FIG. 4. Note that in FIG. 4, the IP section 424 outlet crosses directly to the LP section 428 of the steam turbine via conduit 421. In the double reheat configuration of FIG. 6, steam exiting the IP section 524 outlet is conducted to the HRSG 536 and specifically to a reheater 537 via conduit 539. The reheated steam is then introduced into the LP section 528 of the steam turbine via conduit 541.

It should be understood that the modified cooling duty circuits described above in connection with FIGS. 4 and 5 can also be used in a double reheat system as described in connection with FIG. 6.

In each of the above embodiments described in connection with FIGS. 4–6, the reheat steam which mixes with the gas turbine cooling duty steam (via conduit 417), is also supplied to an auxiliary steam header via conduit 423 (423' in FIG. 5 and 523 in FIG. 6). It will be appreciated that this steam can also be supplied to a co-generation process in a combined heat and power combined cycle (as opposed to a power generation cycle only). In addition, it will be appreciated that the steam for the co-generation process can be extracted from any number of locations in the system, at various temperatures and pressures as appropriate.

The above referenced schematic flow diagrams show cycles incorporating drum type evaporators with natural circulation. The system described herein can also be implemented with once-through steam generators or forced circulation evaporators.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. In a combined cycle system including a gas turbine, a steam turbine and a heat recovery steam generator, wherein gas turbine exhaust is used in the heat recovery steam generator for reheating steam for the steam turbine, the improvement comprising means for supplying gas turbine cooling duty steam from a high pressure section of the steam turbine and conducting the gas turbine cooling duty steam to the gas turbine for cooling hot gas turbine parts, and means for returning the gas turbine cooling duty steam to an intermediate pressure section of the steam turbine.

2. The improvement of claim 1 wherein said gas turbine cooling duty steam is supplied from the discharge of the high pressure section of the steam turbine.

3. The improvement of claim 2 wherein said gas turbine cooling duty steam is extracted from a location in the high pressure section of the steam turbine, downstream of the discharge.

4. The improvement of claim 1 wherein the gas turbine cooling duty steam is returned to an inlet of the intermediate pressure section of the steam turbine.

5. The improvement of claim 1 wherein the gas turbine cooling duty steam is returned to the intermediate pressure section of the steam turbine downstream of the inlet.

6. The improvement of claim 1 and including means for conducting steam exiting from the intermediate pressure section of the steam turbine directly to a low pressure section of the steam turbine.

7. The improvement of claim 1 and including means for conducting steam exiting from the intermediate pressure section of the steam turbine indirectly to a low pressure section of the steam turbine by way of a reheater in the heat recovery steam generator.

8. The improvement of claim 1 wherein steam from a reheater in the heat recovery steam generator is mixed with said gas turbine cooling duty steam before the gas turbine cooling duty steam is returned to the intermediate pressure section of the steam turbine.

9. The improvement of claim 8 wherein a portion of said steam from said reheater is conducted to an auxiliary steam header.

10. The improvement of claim 8 wherein a portion of said steam from said reheater is conducted to a co-generation process.

11. In a combined cycle system including a gas turbine, a steam turbine, and a heat recovery steam generator wherein gas turbine exhaust is used in the heat recovery steam generator for reheating steam for the steam turbine, the improved method of cooling the gas turbine comprising the steps of:
a) removing at least some steam from a high pressure section of the steam turbine and delivering the removed steam to hot parts of the gas turbine to cool said hot parts; and
b) returning the removed steam to an intermediate pressure section of the steam turbine.

* * * * *